US012785501B2

(12) United States Patent
Zhu et al.

(10) Patent No.: US 12,785,501 B2
(45) Date of Patent: Nov. 3, 2026

(54) BALL OR ROLLER GROUP ARRANGEMENT FOR ANNULAR MOTOR

(71) Applicant: Zhuhai Geelly Technology CO., LTD., Zhuhai (CN)

(72) Inventors: Shaowu Zhu, Zhuhai (CN); Dongzhu Zhu, Zhuhai (CN); Shuang Shi, Zhuhai (CN)

(73) Assignee: Zhuhai Geelly Technology CO., LTD., Zhuhai (CN)

( * ) Notice: Subject to any disclaimer, the term of this patent is extended or adjusted under 35 U.S.C. 154(b) by 211 days.

(21) Appl. No.: 18/753,891

(22) Filed: Jun. 25, 2024

(65) Prior Publication Data

US 2024/0372435 A1 Nov. 7, 2024

Related U.S. Application Data

(63) Continuation of application No. PCT/CN2024/091021, filed on Apr. 30, 2024.

(30) Foreign Application Priority Data

May 5, 2023 (CN) ........................ 202321062259.X

(51) Int. Cl.
*H02K 7/08* (2006.01)
*H02K 1/22* (2006.01)
*H02K 1/2706* (2022.01)

(52) U.S. Cl.
CPC ............. *H02K 7/086* (2013.01); *H02K 1/223* (2013.01); *H02K 1/2706* (2013.01)

(58) Field of Classification Search
CPC ...... H02K 1/2706; H02K 1/272; H02K 1/274; H02K 1/2746; H02K 1/2753; H02K 1/278;

(Continued)

(56) References Cited

U.S. PATENT DOCUMENTS 5,850,318 A * 12/1998 Dunfield ............ G11B 19/2009 360/99.08
2009/0147496 A1 6/2009 Sziraki et al.

(Continued)

FOREIGN PATENT DOCUMENTS

CN 205753931 U 11/2016
CN 207320999 U 5/2018

(Continued)

OTHER PUBLICATIONS

CN-212909137-U translation (Year: 2021).*

(Continued)

*Primary Examiner* — Oluseye Iwarere
*Assistant Examiner* — Nicholas Lee Setzer

(57) ABSTRACT

This application relates to an annular motor, which includes a circular ring-shaped inner ring, a circular ring-shaped outer ring, and a junction box. The inner ring is sleeved in the outer ring, and at least one ball group or at least one roller group is installed between the inner ring and the outer ring. One of a coil winding set and even numbers of permanent magnets is installed on an outer side of the inner ring, and the other one of the coil winding set and the even numbers of permanent magnets is installed on an inner side of the outer ring. The junction box is installed on an inner wall of the inner ring or an outer wall of the outer ring, and a lead line of the coil winding set is connected to a binding post in the junction box.

6 Claims, 4 Drawing Sheets

(58) Field of Classification Search
CPC .. H02K 1/2781; H02K 1/2783; H02K 1/2786; H02K 1/2787; H02K 1/2789; H02K 1/2791; H02K 1/27915; H02K 1/2792; H02K 7/086; H02K 7/088
See application file for complete search history.

(56) References Cited

U.S. PATENT DOCUMENTS

| | | | | |
|---|---|---|---|---|
| 2017/0194832 A1* | 7/2017 | Yaguchi | H02K 1/2706 | |
| 2018/0048201 A1* | 2/2018 | Schwarz | H02K 1/278 | |
| 2021/0194317 A1* | 6/2021 | Kim | H02K 5/225 | |
| 2022/0149683 A1* | 5/2022 | Koeda | H02K 15/03 | |
| 2022/0278586 A1* | 9/2022 | Slingerland | H02K 7/083 | |
| 2022/0393547 A1* | 12/2022 | Kim | H02K 5/225 | |
| 2023/0037848 A1* | 2/2023 | Taguchi | H02K 11/225 | |
| 2023/0193989 A1* | 6/2023 | Hu | B25J 9/12 | 74/413 |
| 2023/0261544 A1* | 8/2023 | Kim | H02K 7/1166 | 310/83 |

FOREIGN PATENT DOCUMENTS

| | | |
|---|---|---|
| CN | 212909137 U * | 4/2021 |
| CN | 219659503 U | 9/2023 |

OTHER PUBLICATIONS

Notification of Grant of Patent Rights for utility models dated Aug. 17, 2023 for Chinese Application No. 202321062259.X.
International Search Report and Written Opinion dated Jul. 22, 2024 for International Application No. PCT/CN2024/091021.

* cited by examiner

BALL OR ROLLER GROUP ARRANGEMENT FOR ANNULAR MOTOR

CROSS-REFERENCE TO RELATED APPLICATIONS

This application is a continuation of International Application No. PCT/CN2024/091021, filed on Apr. 30, 2024, which claims priority to Chinese patent application No. 202321062259.X, entitled "ANNULAR MOTOR" and filed with the China National Intellectual Property Administration on May 5, 2023. Both of the above applications are incorporated herein by reference in their entireties.

TECHNICAL FIELD

The present application relates to the field of motor and, in particular, to an annular motor.

BACKGROUND

At present, regardless of a general asynchronous motor, a permanent magnet motor, a servo motor, a new energy motor, or a traction machine, a structure of the motor is composed of a casing, a stator, a rotor, a shaft, bearings, front and rear end covers, and a junction box.

Stator: the stator is composed of coils wound on silicon steel and silicon steel sheets, evenly embedded on the motor casing.

Rotor: the rotor is fixed on the shaft and is composed of silicon steel sheets and coil windings, induction windings (copper or aluminum bars), or magnets.

Shaft: it carries the torque output of the motor, and is divided into a solid shaft and a hollow shaft.

Bearing: an inner diameter portion of the bearing is fixed on the motor shaft, and an outer diameter portion of the bearing is pressed by the front and rear end covers to be fixed on the casing, so as to support and carry the stator and the rotor.

All existing motors have motor shafts. In order to output high torque, it is not only necessary to increase an outer diameter of the motor, but also necessary to increase diameters of the bearing of the motor and the motor shaft. Due to the increase of the diameter of the motor shaft, production costs increase and the weight of the motor increases significantly.

SUMMARY

The purpose of the present application is to overcome the above problems existing in the prior art and provide an annular motor.

To achieve the above technical objectives and achieve the above technical effects, the present application is implemented through the following technical solutions.

An annular motor, includes a circular ring-shaped inner ring, a circular ring-shaped outer ring, and a junction box. The inner ring is sleeved in the outer ring, and at least one ball group or at least one roller group is installed between the inner ring and the outer ring. One of a coil winding set and even numbers of permanent magnets is installed on an outer side of the inner ring, and the other one of the coil winding set and the even numbers of permanent magnets is installed on an inner side of the outer ring. The junction box is installed on an inner wall of the inner ring or an outer wall of the outer ring, and a lead line of the coil winding set is connected to a binding post in the junction box.

Even numbers of magnet installation grooves are provided on an outer wall of the inner ring, and a permanent magnet is embedded in each magnet installation groove. The coil winding set includes an iron core and multiple coils. The iron core is installed on the inner side of the outer ring, multiple core columns for winding coils are provided on an inner side of the iron core, and a set of coils are sleeved on each core column.

Even numbers of magnet installation grooves are provided on an inner wall of the outer ring, and a permanent magnet is embedded in each magnet installation groove. The coil winding set includes an iron core and multiple coils. The iron core is installed on the outer side of the inner ring, multiple core columns for winding coils are provided on an outer side of the iron core, and a set of coils are sleeved on each core column.

There is provided at least one inner rolling groove around the outer side of the inner ring for installing the ball group or the roller group. There is provided at least one outer rolling groove around the inner side of the outer ring for installing the ball group or the roller group. The ball group or the roller group is installed between the outer rolling groove and the inner rolling groove connected with the outer rolling groove.

A circular ring-shaped inner oil seal groove is provided at each of following two positions: above and below each inner rolling groove on an outer wall of the inner ring. A circular ring-shaped outer oil seal groove is provided at each of following two positions: above and below each outer rolling groove on an inner wall of the outer ring. An oil seal ring is installed in the outer oil seal groove and the inner oil seal groove connected with the outer oil seal groove.

Each ball group includes a circular ring-shaped ball retainer and multiple spherical balls. The ball retainer is provided with multiple uniformly distributed ball retaining holes, and a ball is installed in each ball retaining hole.

Each roller group includes a circular ring-shaped roller retainer and multiple cylindrical rollers. The roller retainer is provided with multiple uniformly distributed roller retaining holes, and a roller is installed in each roller retaining hole.

Around a top end of the inner ring, there is provided an inner mounting flange that extends horizontally inward, and multiple uniformly distributed mounting holes A are disposed on the inner mounting flange; and around a bottom end of the outer ring, there is provided an outer mounting flange that extends horizontally outward, and multiple uniformly distributed mounting holes B are disposed on the outer mounting flange.

The beneficial effects of the present application are that: this annular motor does not have a motor shaft, thus reducing the use of steel and reducing the weight of the motor. Moreover, the outer diameter of the motor can change without being constrained by the motor shaft, thus making it easy to change the output torque of the motor by adjusting the planning of the motor's size.

BRIEF DESCRIPTION OF DRAWINGS

The accompanying drawings described here are intended to provide a further understanding of the present application and constitute a part of the present application. The illustrative embodiments and their explanations of the present application are used to explain the present application and do not constitute an improper limitation of the present application. In the attachment drawings.

Figure 1:
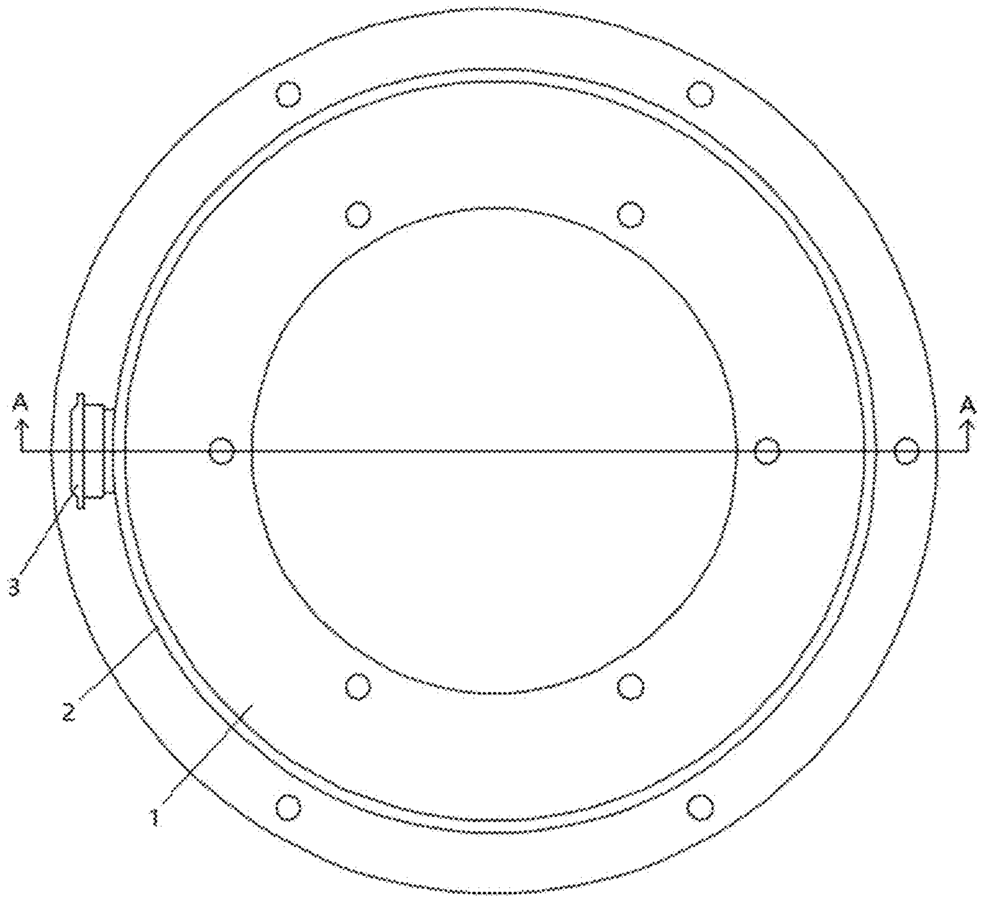
FIG. 1 is a schematic structural diagram of a top view of an annular motor in Embodiment 1 of the present application.
Figure 2:
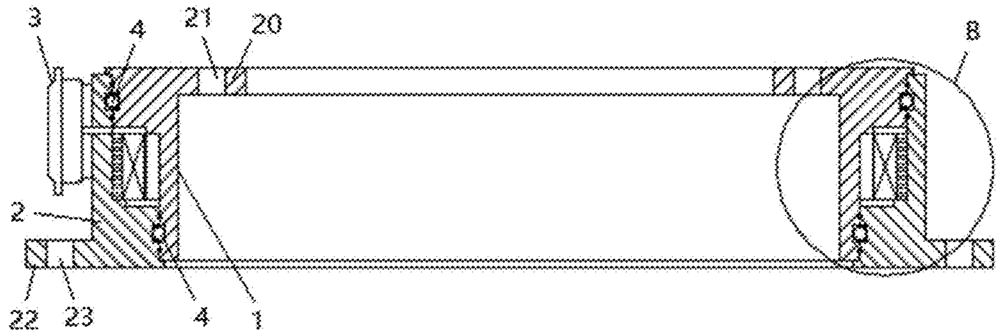
FIG. 2 is a schematic structural diagram along an A-A direction in FIG. 1.
Figure 3:
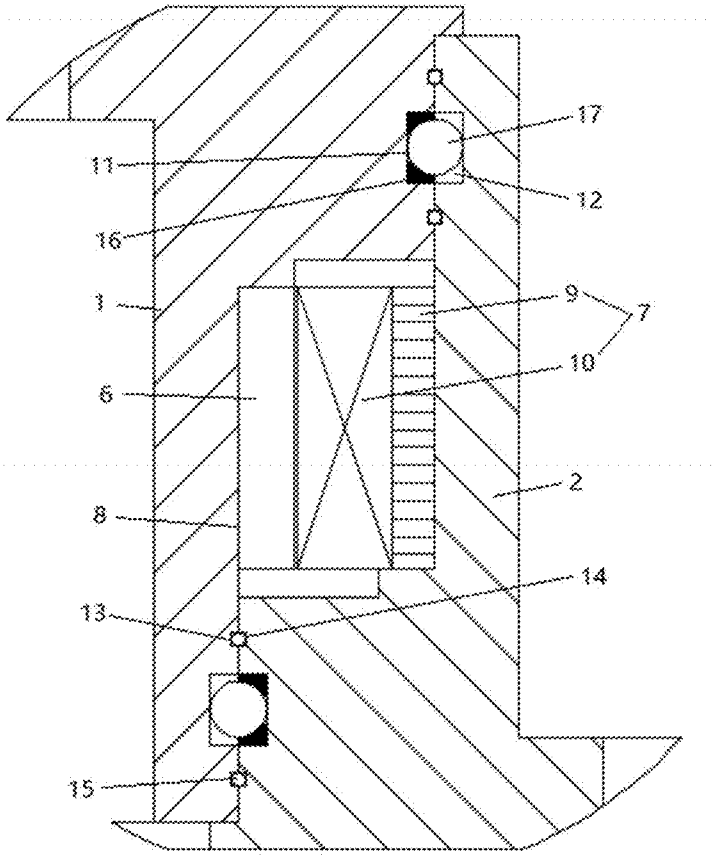
FIG. 3 is a schematic structural diagram of enlarged Part B in FIG. 2.
Figure 4:
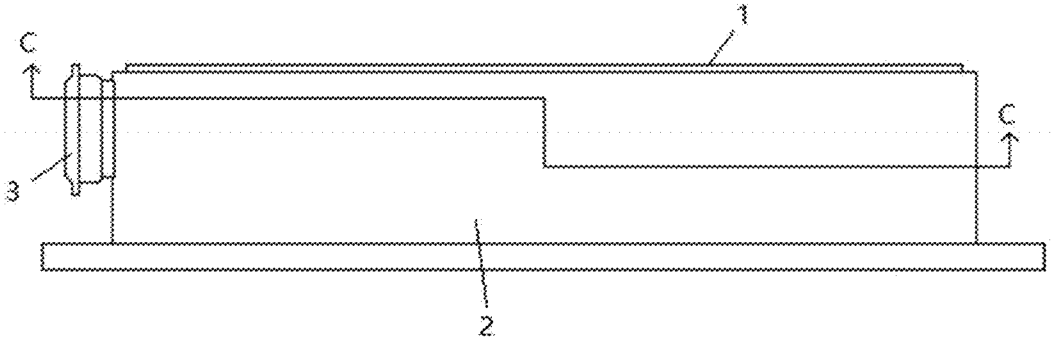
FIG. 4 is a schematic structural diagram of a side view of an annular motor in Embodiment 1 of the present application.
Figure 5:
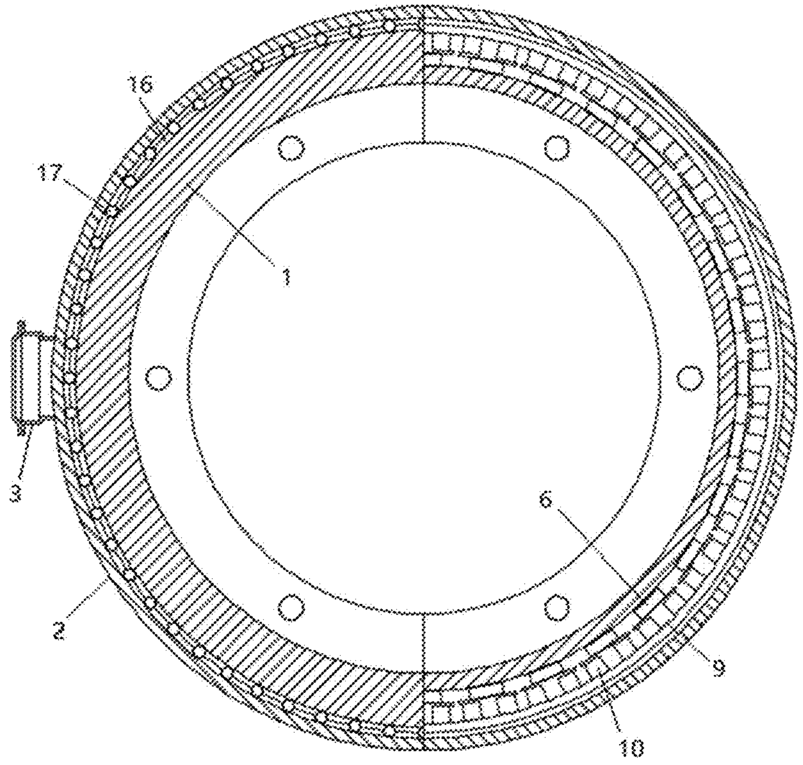
FIG. 5 is a schematic structural diagram along a C-C direction in FIG. 4.

Details of reference numbers: inner ring 1, outer ring 2, junction box 3, ball group 4, roller group 5, permanent magnet 6, coil winding set 7, magnet installation groove 8, iron core 9, coil 10, inner rolling groove 11, outer rolling groove 12, inner oil seal groove 13, outer oil seal groove 14, oil seal ring 15, ball retainer 16, ball 17, roller retainer 18, roller 19, inner installation flange 20, installation hole A 21, outer installation flange 22, installation hole B 23.

DETAILED DESCRIPTION OF EMBODIMENTS

The following will explain the present application in detail with reference to the accompanying drawings and in conjunction with embodiments.

Embodiment 1

In Embodiment 1 shown in FIG. 1 to FIG. 5, an annular motor includes a circular ring-shaped inner ring 1, a circular ring-shaped outer ring 2, and a junction box 3. The inner ring 1 is sleeved in the outer ring 2, and two ball groups 4 are installed between the inner ring 1 and the outer ring 2. Even numbers of permanent magnets 6 are installed on an outer side of the inner ring 1, and a coil winding set 7 is installed on an inner side of the outer ring 2. The junction box 3 is installed on an outer wall of the outer ring 2, and a lead line of the coil winding set 7 is connected to a binding post in the junction box 3.

Even numbers of magnet installation grooves 8 are provided on an outer wall of the inner ring 1, and a permanent magnet 6 is embedded in each magnet installation groove 8. Magnetic poles of any two adjacent permanent magnets towards a center of the inner ring are opposite poles. The coil winding set 7 includes an iron core 9 and multiple coils 10. The iron core 9 is installed on the inner side of the outer ring 2, multiple core columns for winding the coils 10 are provided on an inner side of the iron core 9, and a set of coils 10 are sleeved on each core column.

There are two inner rolling grooves 11 around the outer side of the inner ring 1 for installing the ball groups 4. There are two outer rolling grooves 12 around the inner side of the outer ring 2 for installing the ball groups 4. The ball group 4 is installed between the outer rolling groove 12 and the inner rolling groove 11 connected with the outer rolling groove 12.

A circular ring-shaped inner oil seal groove 13 is provided at each of following two positions: above and below each inner rolling groove 11 on the outer wall of the inner ring 1. A circular ring-shaped outer oil seal groove 14 is provided at each of following two positions: above and below each outer rolling groove 12 on the inner wall of the outer ring 2. An oil seal ring 15 is installed in the outer oil seal groove 14 and the inner oil seal groove 13 connected with the outer oil seal groove 14.

Each ball group 4 includes a circular ring-shaped ball retainer 16 and multiple spherical balls 17, the ball retainer 16 is provided with multiple uniformly distributed ball retaining holes, and a ball 17 is installed in each ball retaining hole.

Around a top end of the inner ring 1, there is provided an inner mounting flange 20 that extends horizontally inward, and multiple uniformly distributed mounting holes A 21 are disposed on the inner mounting flange 20. Around a bottom end of the outer ring 2, there is provided an outer mounting flange 22 that extends horizontally outward, and multiple uniformly distributed mounting holes B 23 are disposed on the outer mounting flange 22.

The outer ring is installed on a motor support mechanism by fasteners, and a mechanism that needs to be driven to rotate is connected to the inner ring by fasteners, and the coil is energized to generate an electromagnetic field to drive the permanent magnet to move, thereby causing the inner ring to rotate and in turn driving the rotation of the mechanism that needs to be driven to rotate.

This annular motor does not have a motor shaft, thus reducing the use of steel and reducing the weight of the motor. Moreover, the outer diameter of the motor can change without being constrained by the motor shaft, thus making it easy to change the output torque of the motor by adjusting the planning of the motor's size.

Embodiment 2

Figure 6:
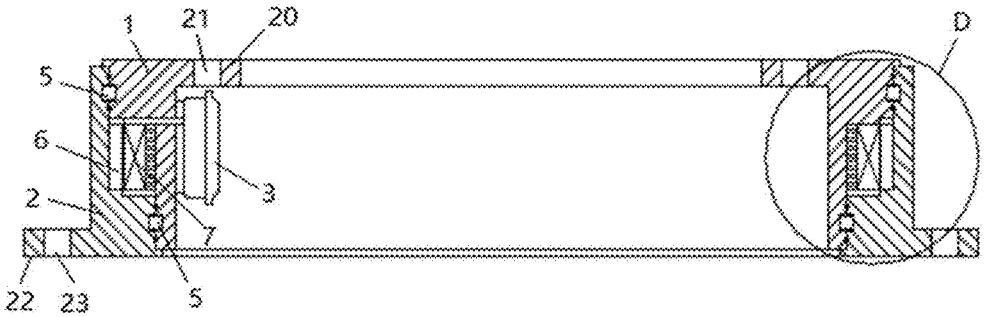
FIG. 6 is a sectional view of an annular motor in Embodiment 2 of the present application.
Figure 7:
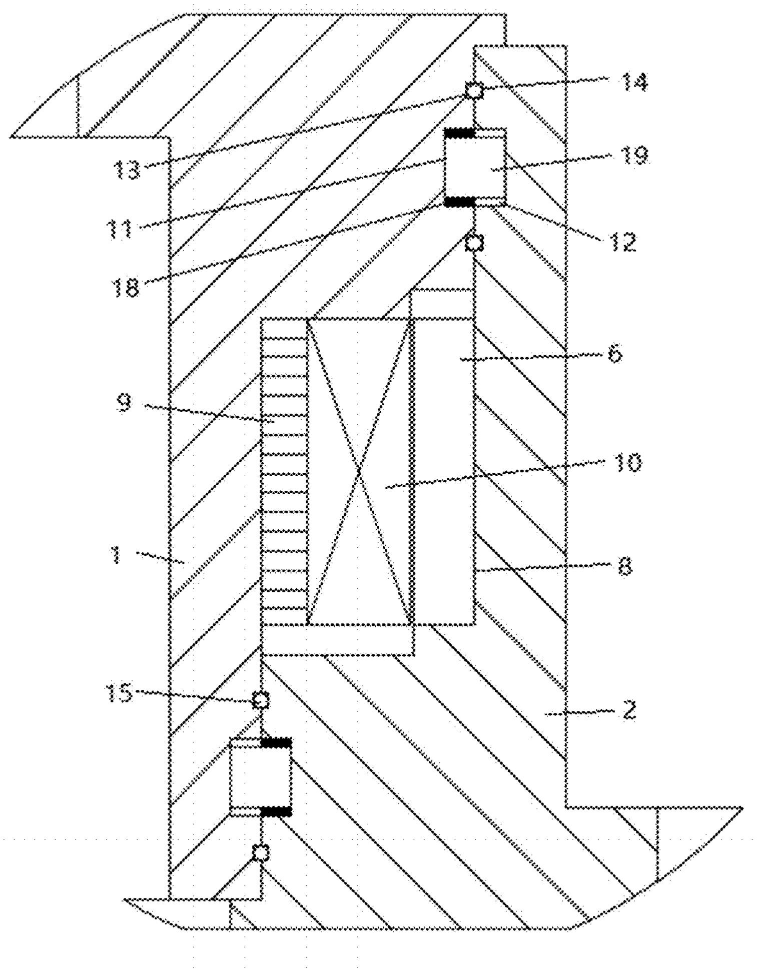
FIG. 7 is a schematic structural diagram of enlarged Part D in FIG. 6.

In Embodiment 2 shown in FIG. 6 and FIG. 7, an annular motor includes a circular ring-shaped inner ring 1, a circular ring-shaped outer ring 2, and a junction box 3. The inner ring 1 is sleeved in the outer ring 2, and two roller groups 5 are installed between the inner ring 1 and the outer ring 2. A coil winding set 7 is installed on an outer side of the inner ring 1, and even numbers of permanent magnets 6 are installed on an inner side of the outer ring 2. The junction box 3 is installed on an inner wall of the inner ring 1, and a lead line of the coil winding set 7 is connected to a binding post in the junction box 3.

Even numbers of magnet installation grooves 8 are provided on the inner wall of the outer ring 2, and a permanent magnet 6 is embedded in each magnet installation groove 8. Magnetic poles of any two adjacent permanent magnets towards a center of the outer ring are opposite poles. The coil winding set 7 includes an iron core 9 and multiple coils 10. The iron core 9 is installed on the outer side of the inner ring 1, multiple core columns for winding coils 10 are provided on an outer side of the iron core 9, and a set of coils 10 are sleeved on each core column.

There is provided at least one inner rolling groove 11 around the outer side of the inner ring 1 for installing the roller group 5. There is provided at least one outer rolling groove 12 around the inner side of the outer ring 2 for installing the roller group 5. The roller group 5 is installed between the outer rolling groove 12 and the inner rolling groove 11 connected with the outer rolling groove 12.

A circular ring-shaped inner oil seal groove 13 is provided at each of following two positions: above and below each inner rolling groove 11 on the outer wall of the inner ring 1. A circular ring-shaped outer oil seal groove 14 is provided at each of following two positions: above and below each outer rolling groove 12 on the inner wall of the outer ring 2.

An oil seal ring 15 is installed in the outer oil seal groove 14 and the inner oil seal groove 13 connected with the outer oil seal groove 14.

Each roller group 5 includes a circular ring-shaped roller retainer 18 and multiple cylindrical rollers 19, the roller retainer 18 is provided with multiple uniformly distributed roller retaining holes, and a roller 19 is installed in each roller retaining hole.

Around a top end of the inner ring 1, there is provided an inner mounting flange 20 that extends horizontally inward, and multiple uniformly distributed mounting holes A 21 are disposed on the inner mounting flange 20. Around a bottom end of the outer ring 2, there is provided an outer mounting flange 22 that extends horizontally outward, and multiple uniformly distributed mounting holes B 23 are disposed on the outer mounting flange 22.

The inner ring is installed on a motor support mechanism by fasteners, and a mechanism that needs to be driven to rotate is connected to the outer ring by fasteners, and the coil is energized to generate an electromagnetic field to drive the permanent magnet to move, thereby causing the outer ring to rotate and in turn driving the rotation of the mechanism that needs to be driven to rotate.

The above shows and describes the basic principles, main features, and advantages of the present application. The person skilled in the art should understand that the present application is not limited by the above embodiments. The above embodiments and descriptions in the specification only explain the principles of this application. Without departing from the spirit and scope of this application, there will be various changes and improvements for this application, which fall within the protection scope of the present application.

What is claimed is:

1. An annular motor, comprising a circular ring-shaped inner ring, a circular ring-shaped outer ring, and a junction box, wherein the inner ring is sleeved in the outer ring, and at least one ball group or at least one roller group is installed between the inner ring and the outer ring; one of a coil winding set and even numbers of permanent magnets is installed on an outer side of the inner ring, and the other one of the coil winding set and the even numbers of permanent magnets is installed on an inner side of the outer ring; the junction box is installed on an inner wall of the inner ring or an outer wall of the outer ring, and a lead line of the coil winding set is connected to a binding post in the junction box;

wherein there is provided at least one inner rolling groove around the outer side of the inner ring for installing the ball group or the roller group; there is provided at least one outer rolling groove around the inner side of the outer ring for installing the ball group or the roller group; the ball group or the roller group is installed between the outer rolling groove and the inner rolling groove connected with the outer rolling groove;

wherein a circular ring-shaped inner oil seal groove is provided at each of following two positions: above and below each inner rolling groove on an outer wall of the inner ring, a circular ring-shaped outer oil seal groove is provided at each of following two positions: above and below each outer rolling groove on an inner wall of the outer ring, an oil seal ring is installed in the outer oil seal groove and the inner oil seal groove connected with the outer oil seal groove.

2. The annular motor according to claim 1, wherein even numbers of magnet installation grooves are provided on an outer wall of the inner ring, and one of the permanent magnets is embedded in each magnet installation groove; the coil winding set comprises an iron core and multiple coils, the iron core is installed on the inner side of the outer ring, multiple core columns for winding the coils are provided on an inner side of the iron core, and a set of coils are sleeved on each core column.

3. The annular motor according to claim 1, wherein even numbers of magnet installation grooves are provided on an inner wall of the outer ring, one of the permanent magnets is embedded in each magnet installation groove; the coil winding set comprises an iron core and multiple coils, the iron core is installed on the outer side of the inner ring, multiple core columns for winding coils are provided on an outer side of the iron core, and a set of coils are sleeved on each core column.

4. The annular motor according to claim 1, wherein each ball group comprises a circular ring-shaped ball retainer and multiple spherical balls, the ball retainer is provided with multiple uniformly distributed ball retaining holes, and a ball is installed in each ball retaining hole.

5. The annular motor according to claim 1, wherein each roller group comprises a circular ring-shaped roller retainer and multiple cylindrical rollers, the roller retainer is provided with multiple uniformly distributed roller retaining holes, and a roller is installed in each roller retaining hole.

6. The annular motor according to claim 1, wherein around a top end of the inner ring, there is provided an inner mounting flange that extends horizontally inward, and multiple uniformly distributed mounting holes are disposed on the inner mounting flange; around a bottom end of the outer ring, there is provided an outer mounting flange that extends horizontally outward, and multiple uniformly distributed mounting holes are disposed on the outer mounting flange.

* * * * *